United States Patent [19]

Larmie

[11] Patent Number: 5,551,963
[45] Date of Patent: Sep. 3, 1996

[54] ABRASIVE GRAIN CONTAINING ALUMINA AND ZIRCONIA

[75] Inventor: Henry A. Larmie, Oakdale, Minn.

[73] Assignee: Minnesota Mining and Manufacturing Co., St. Paul, Minn.

[21] Appl. No.: 554,033

[22] Filed: Nov. 6, 1995

Related U.S. Application Data

[63] Continuation of Ser. No. 239,926, May 9, 1994, abandoned, which is a continuation of Ser. No. 951,654, Sep. 25, 1992, abandoned.

[51] Int. Cl.⁶ ..................................................... B24D 3/34
[52] U.S. Cl. ................................................ 51/307; 51/309
[58] Field of Search ................................ 51/293, 307, 309

[56] References Cited

U.S. PATENT DOCUMENTS

| | | | |
|---|---|---|---|
| 3,454,385 | 7/1969 | Amero | 51/298 |
| 3,891,408 | 6/1975 | Rowse et al. | 51/295 |
| 4,126,429 | 11/1978 | Watson | 51/309 |
| 4,314,827 | 2/1982 | Leitheiser et al. | 51/298 |
| 4,331,627 | 5/1982 | Yamamoto et al. | 264/332 |
| 4,333,859 | 6/1982 | Vaugham et al. | 252/455 Z |
| 4,457,767 | 7/1984 | Poon et al. | 51/298 |
| 4,518,397 | 5/1985 | Leitheiser et al. | 51/293 |
| 4,744,802 | 5/1988 | Schwabel | 51/309 |
| 4,770,671 | 9/1988 | Monroe et al. | 51/293 |
| 4,829,031 | 5/1989 | Roy et al. | 501/134 |
| 4,881,851 | 11/1989 | Wood et al. | 51/309 |
| 4,952,536 | 8/1990 | Block . | |
| 4,960,441 | 10/1990 | Pellow et al. | 51/293 |
| 4,997,461 | 3/1991 | Markhoff-Matheny et al. | 51/295 |
| 5,002,911 | 3/1991 | Matsumoto et al. | 501/105 |
| 5,076,815 | 12/1991 | Kunz et al. | 51/309 |
| 5,131,926 | 7/1992 | Rostoker et al. | 51/309 |
| 5,164,348 | 11/1992 | Wood | 51/309 |
| 5,185,299 | 2/1993 | Wood et al. | 501/95 |
| 5,194,072 | 3/1993 | Rue et al. | 51/309 |
| 5,201,916 | 4/1993 | Berg et al. | 51/293 |
| 5,204,300 | 4/1993 | Kumgai et al. | 501/127 |
| 5,215,551 | 6/1993 | Hatanaka et al. | 51/293 |
| 5,259,147 | 11/1993 | Falz et al. | 51/293 |

FOREIGN PATENT DOCUMENTS

| | | | |
|---|---|---|---|
| 394850 | 12/1991 | Austria | C04B 35/10 |
| 0236507A1 | 9/1987 | European Pat. Off. | C04B 35/10 |
| 256182A1 | 2/1988 | European Pat. Off. | C04B 35/10 |
| 0293164 | 11/1988 | European Pat. Off. | C04B 35/10 |
| 0293163 | 11/1988 | European Pat. Off. | C04B 35/10 |
| 0368837 | 5/1990 | European Pat. Off. | C04B 35/10 |
| 408771A1 | 1/1991 | European Pat. Off. | C04B 35/10 |
| 0435677A2 | 7/1991 | European Pat. Off. | C04B 35/10 |
| 0441640A2 | 8/1991 | European Pat. Off. | C04B 35/10 |
| 4097942 | 3/1992 | Japan | C04B 35/18 |
| WO92/01646 | 2/1992 | WIPO | C04B 35/10 |

OTHER PUBLICATIONS

"High Toughness Ce-TZP/Al₂O₃ Cermaics with Improved Hardness and Strength," R. A. Cutler et al., J. Am. Ceram. Soc., 74, No. 1. (1991), pp. 179–186.

"The Hardness, Stiffness and Toughness of Diphasic Abrasive Materials Prepared by Sol–Gel Techniques," E. Breval et al., Mat. Res. Bull., 20, No. 4 (1985), pp. 413–429.

"Use of Sintered Ceramic Aluminum Oxides in Vitrified Bonded Wheels," S. C. Yoon et al., SME Technical Paper EM90-360, (1990).

"Chemical Processing of Ceramics," D. R. Ulrich, C&EN Special Report, Jan. 1, 1990, pp. 28–40.

"Influence of Small ZrO₂ Additions on the Microstructure and Mechanical Properties of Al₂O₃," Hori et al., Advances in Ceramics, Science and Technology of Zirconia III, 24A, The American Ceramic Society, (1988), pp. 423–429.

Primary Examiner—Deborah Jones

[57] ABSTRACT

A method of preparing preferred abrasive grain includes: preparing a dispersion including alpha alumina oxide monohydrate and zirconia sol therein; converting the dispersion to base grit material; and sintering the base grit to form abrasive grains. The presence of the zirconia sol within the dispersion from which the base grits are formed provides an improved abrasive grain. The improved abrasive grain are useful in abrasive products.

25 Claims, 4 Drawing Sheets

ABRASIVE GRAIN CONTAINING ALUMINA AND ZIRCONIA

This is a continuation of application Ser. No. 08/239,926 filed May 9, 1994, now abandoned, which is a continuation of application Ser. No. 07/951,654 filed Sep. 25, 1992 now abandoned.

FIELD OF THE INVENTION

The present invention relates to an improved alumina-zirconia abrasive grain and a method of making the same. The improved abrasive grain are useful in abrasive products.

BACKGROUND OF THE INVENTION

The abrasives industry generally concerns abrasive products comprising a binder and a plurality of abrasive grains which are used to abrade a workpiece (e.g., stainless steel). It is the abrasive grains which are responsible for the cutting action of an abrasive product when it is applied to the workpiece. During use, the abrasive grains of an abrasive product can be subject to relatively high pressures, temperatures and rotative speeds; thus, preferred abrasive grains are hard, tough, and chemically resistant to the workpiece being abraded. In general, the hardness property is associated with the abrasive grain resisting yield from the forces of grinding. The toughness property is associated with the strength and fracture resistance of the abrasive grain. Chemical resistance generally relates to the chemical nature of the material from which the abrasive grain is formed, and the conditions of grinding.

Abrasive grains comprising fused aluminum oxide are well known and widely utilized. Over the past decade improved abrasive grains generally comprising the product of a sol-gel ceramic process conducted with aluminum oxide have also been developed. Such improved ceramic grains are generally tougher than fused aluminum oxide grains.

SUMMARY OF THE INVENTION

According to the present invention, a method of preparing abrasive grain is provided. The method generally includes the steps of preparing a dispersion including alumina hydrate (preferably, a sufficient amount of alumina hydrate to provide, after sintering, abrasive grain comprising about 70 to about 99.9 percent (about 70 to about 97, or even about 70 to about 95) by weight alumina, based on the total weight of the abrasive grain, wherein the alumina of the abrasive grain is present as one of alpha alumina, an alumina reaction product(s), or a combination thereof) and an effective amount of zirconia (as a sol) therein. From the dispersion is formed alumina base grit material having zirconia therein. The zirconia is distributed relatively evenly throughout the base grit material. The base grit material is sintered to provide alumina abrasive grain (with the majority of the zirconia particles distributed uniformly and randomly throughout) according to the present invention.

In general, the dispersion from which the base grit material is formed should include a weight ratio therein of alumina hydrate to zirconia sol such that the percentage amount of zirconia in the sintered abrasive grain will be, by weight on an elemental oxide basis, from about 0.1% to about 50% (the remainder comprising alpha alumina and/or other metal oxides including alumina-metal oxide reaction product(s). The term "reaction product(s)" as used herein refers to oxide(s) that form between two or more metal oxides. For example, alumina and magnesium oxide, if present, may form spinel; alumina, magnesium oxide, if present, and lanthanum oxide, if present, may form $MgLnAl_{11}O_{19}$; and titanium oxide, if present, and magnesium oxide, if present, may form $MgTi_2O_4$. Further, spinel is an example of reaction product that is both an alumina reaction product and a magnesium oxide product.

If the zirconia is added to the dispersion as a zirconia sol, the zirconia sol added should generally comprise about 5 to about 60%, preferably about 15 to about 40%, colloidal zirconia particles, the remainder generally comprising the liquid carrier (preferably water, more preferably deionized water) for the zirconia sol. Alternatively, the zirconia particles can be mixed into the dispersion with zirconia sol formation generated in situ. In preferred practices according to the present invention, the zirconia particles in the dispersion from which the base grit material is formed should comprise at least about 97% by weight zirconia particles less than about 0.2 micrometer (and preferably at least about 97% by weight less than about 0.1 micrometer) in size. Preferably, the zirconia particles are at least about 90% by weight less than about 0.05 micrometer in size, and, most preferably at least about 50% by weight less than about 0.02 micrometer in size. In some applications, zirconia having an average particle size range of about 0.005 micrometer to about 0.01 micrometer will be preferred.

The method may include preparing a dispersion having nucleating material therein. The term "nucleating material" as used herein refers to a nucleating agent or precursor thereof. The method may also involve a step of including a metal oxide precursor (modifier precursor) within the dispersion.

The base grits formed from the dispersion may be treated, for example, by impregnating with metal oxide (modifier precursor) precursor solution and/or by coating prior to sintering.

A formulation for obtaining preferred abrasive grain is provided. The formulation includes provision of alumina, zirconia, magnesium oxide, rare earth oxide and optionally yttria (or their sintered products).

The invention includes within its scope abrasive grain such as those formed according to the process described. It also includes abrasive products having abrasive grains according to the present invention therein.

In general, preferred abrasive grain according to the present invention include a sintered core comprising the sintered product of grit material; the sintered product containing alumina and about 0.05 to about 1 micrometer sized particles (diameter) of zirconia; the alumina in the sintered product generally comprising alpha alumina. The sintered product (core) or sintered particle generally includes a region (or regions) of the zirconia particles distributed randomly and uniformly between alpha alumina crystallites. Herein in this context the term "sintered core" or "core" is meant to refer to the sintered base grit without regard to any coating on the abrasive grain.

The drawings comprise a part of this specification and include therein exemplary embodiments. In the drawings, relative material thicknesses may be shown exaggerated to facilitate an understanding of the invention.

DETAILED DESCRIPTION OF THE PREFERRED EMBODIMENTS

Figure 1:
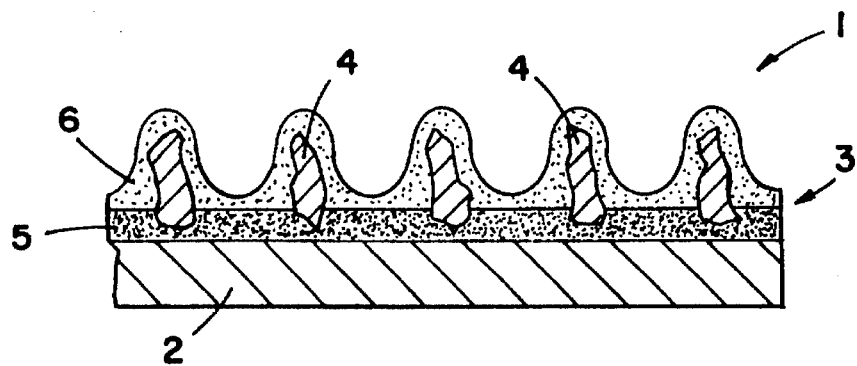
FIG. 1 Is a fragmentary cross-sectional schematic view of a coated abrasive product incorporating therein abrasive grains according to the present invention.

The present invention concerns the discovery that unique abrasive grains result if the abrasive grains are formed from a ceramic sol-gel process in which the sol-gel is formed from aluminum hydrate and an effective amount of zirconia as a sol. The invention also concerns abrasive products incorporating abrasive grain material according to the general principles described herein. The performance of abrasive products will, in general, be improved due to the character of the incorporated abrasive grains. Resulting advantage will generally be reflected in product performance and/or product lifetime.

Herein the term "abrasive grain" and variants thereof will be used to refer to the granular abrasive material after it has been prepared for inclusion in an abrasive product. The term "base grit" or "base grit material" will be used to refer to alumina-based, zirconia-containing, ceramic grit precursor which, when sintered or calcined or sintered, provides abrasive grain according to the present invention. Calcined and uncalcined base grit, as described herein, typically have sufficient porosity to allow a liquid (e.g., water or an organic solvent) to impregnate the pores through capillary action.

Preparation of the Base Grits

In general, base grits according to the present invention are prepared according to a process involving the steps of: (a) generating a dispersion of alumina hydrate and zirconia as a sol; and (b) drying the dispersion. The dried dispersion may be crushed to produce particles as base grits. Alternatively, the dispersion may be only partly dried, shaped, and then further dried to base grit material. The base grit material may be converted to abrasive grains by sintering. Optionally, the base grits may be classified and/or modified prior to the sintering process.

Sol-gel processes for preparation for alpha alumina base grits are generally described, for example, in U.S. Pat. Nos. 5,011,508 (Wald), 4,744,802 (Schwabel), 4,623,364 (Cottringer), 4,574,003 (Gerk), 4,518,397 (Leitheiser et al.), 4,770,671 (Monroe), and 4,881,951 (Wood), the disclosures of which are incorporated herein by reference. In general, the sol-gel processes disclosed in those references are followed in preferred applications of the present invention, except for the inclusion within the sol-gel of zirconia as a zirconia sol, as described hereinbelow. The presence of an effective amount of zirconia, as a sol, within the sol-gel is associated with improved abrasive grains according to the present invention.

Preparation of the alumina base grits by the sol-gel process typically involves first preparing a dispersion comprising about 2 to about 60 weight percent alpha aluminum oxide monohydrate (typically boehmite), although other alumina oxide hydrates may be used; and, an effective amount of zirconia as a sol. The weight percent of alpha alumina stated is based on a total of aluminum oxide hydrate plus liquid carrier without regard to adjuvants or other additives. The boehmite can be prepared from various conventional techniques or it can be acquired commercially. Commercially available boehmite usable in sol-gel processes as described herein include: Disperal®, available from Condea Chemie, GMBH of Hamburg, Germany, and Catapal®, available from Vista Chemical Co. of Houston, Tex. These aluminum oxide monohydrates are in alpha form, are relatively pure (including relatively little, if any, hydrate phases other than the monohydrate) and have a high surface area.

Although the liquid carrier may be a non-polar organic carrier (e.g., heptane or hexane), the liquid carrier is typically water, preferably deionized water. Generally the dispersion (with respect to all components) contains at least about 10% by weight liquid carrier, preferably between about 30 and about 80% by weight liquid carrier.

As indicated above, the dispersion should contain an effective amount zirconia as a sol. The term "effective amount," in this context, refers to a requirement that the dispersion should contain sufficient zirconia particles as a sol, such that when the alumina is transformed to alpha alumina from the transitional aluminas during sintering, improvement in densification (i.e., greater densification) is observed (relative to an alumina particle without any modifier for densification present). The sintered abrasive grain preferably has a density of at least 90 percent of theoretical. Preferably, the weight ratio of the alumina hydrate to the zirconia provided in the dispersion should be such that the sintered abrasive grain will comprise by weight about 0.1% to about 50% zirconia (on an elemental oxide basis).

It is noted that densification of alpha alumina is known to be improved by introduction of zirconium salts into the grit material (see U.S. Pat. No. 4,314,827 (Leitheiser et al.)). However, introduction of zirconia precursors as a zirconium salt into the sol-gel process is not as desirable as introducing the zirconia as a sol of zirconium oxide. Reasons for this include the following: (1) the resulting product has a preferred microstructure if the zirconia is introduced as a sol; (2) the zirconia tends to be more uniformly distributed throughout the sol-gel (and grit material) if not introduced as a salt, because salt migration during drying can lead to a concentration of zirconia near the surface of the grit material; and (3) zirconia salt addition may tend to promote premature gelation, which can yield an undesirably high porosity in the grits and which may interfere with good mixing.

A zirconia sol comprises a plurality of colloidal zirconia particles (zirconium oxide) dispersed in liquid medium. The liquid medium can be water (preferably deionized water) or a non-polar organic carrier (e.g., hexane and heptane), however, it is preferred that a majority (greater than 50% by weight) of the liquid medium be water (preferably deionized water). Zirconia sol presence in the aluminum oxide dispersion may be assured by adding a pre-prepared zirconia sol to the dispersion. Suitable zirconia sols are commercially available, for example, from Nyacol Products, Inc., of Ashland, Mass. Alternatively, zirconia particles (not as a sol) can be mixed into the dispersion.

The zirconia particles should be classified to a size of at least about 97% (preferably about 100%) by weight less than about 0.2 micrometer, and, preferably, at least about 97% by weight less than about 0.1 micrometer. Also, preferably the zirconia particles comprise at least about 90% by weight less than about 0.05 micrometer with at least about 50% by weight less than about 0.02 micrometer. Herein, the term "size" in this context is meant to refer to the longest dimension of the particles (typically approximating a diameter since the particles are often equiaxed or nearly round). If the zirconia is added as a sol, the zirconia sol added to the aluminum oxide dispersion should preferably contain, by weight, between about 50% and about 60%, and, more preferably, between about 15% and about 40% colloidal zirconia particles of a size less than about 0.05 micrometer (the remainder generally comprising liquid carrier). The pH of the zirconia sol should generally be less than about 5, preferably less than about 4. The zirconia sol may contain nitric acid or acetic acid as a stabilizer to inhibit agglomeration of the zirconia particles.

The dispersion may be formed from the zirconia (preferably as a sol), alpha aluminum hydrate, liquid carrier, and any adjuvants by simply mixing the components together. A convenient method is to add the zirconia particles (as a sol) to the alpha alumina hydrate dispersion with high shear mixing.

A peptizing agent may be used in the dispersion to produce a more stable hydrosol or colloidal dispersion. Monoprotic acids which may be used as the peptizing agent include acetic, hydrochloric, formic, and nitric acids. Nitric acid is the preferred peptizing agent. Multiprotic acids are generally avoided because they tend to rapidly gel the dispersion, making it difficult to handle or to mix in additional components. Some commercial sources of boehmite contain an acid titer (e.g., acetic, formic, or nitric acid) to assist in forming a stable dispersion.

The dispersion may contain a precursor or modifying additive (modifier) which is added to enhance some desired property of the finished product or to increase the effectiveness of a subsequent processing step such as sintering. Such modifiers are generally introduced in the form of a modifier precursor to an oxide (typically a metal salt material which is a precursor to the corresponding oxide; conversion being accomplished upon application of heat during calcining) soluble in a liquid carrier. They typically comprise water soluble salts. Mixtures of modifiers or modifier precursors may be utilized. Water soluble salts comprising metal salt precursors (e.g., nitrates or acetates) for oxides of magnesium, zinc, cobalt, nickel, hafnium, chromium, yttrium, praseodymium, samarium, ytterbium, neodymium, lanthanum, gadolinium, cerium, dysprosium, erbium, titanium, and mixtures thereof are usable modifier precursors. Even zirconium salts may be used, if they are not used in place of zirconia particles. Exact proportions of these components present in the sol-gel dispersions (for grit formation) are not critical to the principles of the present invention and thus can be varied to convenience. These modifiers and their uses in abrasive grains are further described in, for example, U.S. Pat. Nos. 4,518,397 (Leitheiser et al.), 4,770,671 (Monroe), and 4,881,951 (Wood), the disclosures each of which are incorporated herein by reference.

A preferred method for incorporating ceria into the abrasive grain is disclosed in Assignee's copending application entitled "Method For Making Abrasive Grain Containing Alumina and Ceria," U.S. Ser. No. 07/951,443 filed the same date as the instant application, the disclosure of which is incorporated herein by reference.

The dispersion may contain a nucleating material in an amount effective to enhance the transformation to alpha alumina. Suitable nucleating materials include fine particles of alpha alumina, alpha ferric oxide or its precursor, titanates or their precursors, chromium oxide or its precursor, and other materials which can nucleate the transformation of the base grits during sintering. Nucleating such dispersions is disclosed, for example, in U.S. Pat. Nos. 4,774,802 (Schwabel), 4,623,364 (Cottringer), and 4,964,883 (Morris), the disclosures of which are incorporated herein by reference.

Shaping of the gel, which is optional, may be accomplished by conventional means such as pressing, molding, coating, extrusion, cutting, or some combination of those steps, with drying. It may be done in steps, for example, by first forming a plastic mass of the partially dried dispersion through extrusion. The resulting plastic mass is shaped by any convenient method such as pressing, molding, or extrusion and then dried to produce the desired shape, for example, a rod, pyramid, disk, diamond, cone, or similar shape. Irregularly-shaped abrasive grain products are conveniently formed by depositing the dispersion in any convenient size and shape of drying vessel (e.g., a pan-shaped vessel) and drying, typically at a temperature below the frothing temperature of the dispersion.

Whether shaped or not, the dispersion or gelled dispersion is generally dried (e.g., dewatered) to a solid. Conventional means may be utilized to dry the dispersion. Air drying steps may be used, as well as various dewatering methods. Drying can be accomplished, for example, in a forced air oven at a temperature in the range of about 50° C. to about 200° C., preferably between about 75° C. and about 125° C. Generally, the gelled dispersion is heated slowly during drying to inhibit frothing.

After the dispersion is dry, it may be crushed or shaped through any suitable means. Examples of crushing techniques include use of a hammer mill, ball mill, or roll crusher. Any method of comminuting the solid can be used, and the term "crushing" is meant to refer to any such method. In general, a wide variety of particle sizes, i.e., about 10 to about 4000 micrometers, may be used as base grits. Generally a selected size range is isolated for any given use. Classification steps such as screening may be used to obtain selected particle sizes or size fractions. It is noted that sintering, or calcining and sintering, generally leads to particle shrinkage on the order of about 33% of linear dimension. This should be taken into consideration during fraction selection.

The crushed or shaped material may, in some instances, comprise the base grits or base grit material. In other instances, the crushed or shaped material will comprise a "grit precursor," the base grit material being formed by calcining the material or providing other modifications thereto. In typical applications, it will be preferred to calcine the base grit material to remove water or other volatiles. If the grits are formed using a non-polar organic solvent as the liquid carrier, a calcining step is typically not needed.

During calcining, essentially all of the volatiles are removed from the grit precursor. Also, any modifier precursors that were present in the dispersion and which are now retained within the grit precursor are transformed to a metal oxide during the calcining process. During calcining, the base grits are generally heated to a temperature between about 400° C. and about 1000° C., preferably about 400° C. to about 800° C. The base grits are held within this temperature range until the free water and preferably over about 90 wt-% of any bound volatiles are removed. Further, if the grit precursor contains a modifier precursor, the base grits are preferably calcined for a period of time sufficient to achieve essentially complete conversion of the modifier precursor to oxide. The resulting calcined base grits are porous particles.

Conversion of the Base Grit Material to Improved Abrasive Grains

The principal step of conversion of the base grit to abrasive grain is sintering of the base grit (i.e., uncalcined dried gel) or grit precursor (i.e., calcined dried gel) to form the ceramic abrasive grain comprising alumina and zirconia. However, modifiers, nucleating materials, and/or coating may be added to the base grits.

A. Sintering of the Abrasive Grain Precursor

Sintering of the grains may be accomplished through a variety of conventional processes. Typically, the sintering will be conducted at a temperature between about 1200° C. and 1650° C. for a sufficient period of time to complete the conversion of the precursor. Generally, the sintering step comprises the conversion of alpha alumina precursor (e.g., transitional alumina) to alpha alumina (or alpha alumina and reaction product of alumina with metal oxide modifier(s)). Although the length of time to which the base grits or grit precursors should be exposed to sintering temperatures may be varied depending upon factors such as the precise composition of the grit, generally sintering can be accomplished within a time period of a few seconds to about 120 minutes. Sintering of various types of base grits is described in general in U.S. Pat. No. 4,314,827 (Leitheiser et al.), incorporated herein by reference. The techniques of sintering described in that reference may be applied to grits prepared according to the present invention.

B. (Optional) Impregnation of Base Grits with Modifier and/or Nucleating Material Prior to Sintering In some instances, preferred characteristics can be imparted to the sintered product by impregnating the uncalcined and/or calcined base grits with an impregnating solution of a metal oxide modifier provided in the form of precursor comprising one or more salts of a metal (e.g., a metal nitrate or acetate salt). Impregnating is generally described in U.S. Pat. No. 5,164,348, (Wood) filed Nov. 27, 1991, incorporated herein by reference. Calcined base grits prepared according to the sol-gel process are porous, i.e., they generally have pores about 700–900 nanometers in size (diameter) extending therein from an outer surface. In general, impregnation involves mixing a liquid medium (preferably water, more preferably, deionized water, although a non-polar solvent (e.g., heptane or hexane) may also be useful) having the metal salts dissolved therein with the base grits. Preferably, at least about 60 ml of the impregnating solution is mixed with each 100 grams of porous base grit, if the grits are prepared as described above, to achieve a thorough saturation of the grits with the solution. The modifier precursors may be selected from the group identified above as optionally usable in the sol-gel process. Generally, impregnation will be sufficient if the resulting base grit, after impregnation and later sintering includes at least about 0.1% by weight, and, preferably, about 1 to about 30% by weight of the oxide product of the impregnate (the weight percentage being calculated on the basis of the total weight of the sintered abrasive grain and on a theoretical elemental oxide basis).

For impregnation of dried gel, the liquid medium should be selected such that the dried gel is not dissolved by it. For example, a dried gel derived from an aqueous gel will dissolve in water. A suitable liquid medium for an impregnating solution for a dried gel derived from an aqueous gel may be a non-polar solvent.

A nucleating material may be added to the base grits. The nucleating material may be added by treating the porous base grits with a liquid medium having nucleating material carried therein. The treatment may be conducted simultaneously with impregnation of the modifier precursor(s).

The abrasive grains of the present invention may further comprise a surface coating, i.e., a coating covering the sintered core. Typically, the coating will comprise metal oxide, most typically zirconia, silica or alumina (e.g., alpha alumina, transitional alumina, or hydrated alumina). Any of a variety of coating methods may be utilized, including the ones described in U.S. Pat. Nos. 5,011,508 (Wald), 1,910,440 (Nicholson), 3,041,156 (Rowse), 5,009,675 (Kunz), 4,997,461 (Markhoff-Matheny), and 5,042,991 (Kunz), the disclosures of which are incorporated herein by reference. The preparation of the coating may include the use of nucleating material. In some instances, a preferred coating, not described in the above-cited references, may be applied to the base grits by addition of a dispersion or suspension carrying inorganic particulates (typically metal oxides) therein to the base grits. A coating formed from inorganic particulates in this manner is described in Assignee's copending U.S. application Ser. No. 07/920,768, incorporated herein by reference. An alternative coating formed from metal alkoxides is described in Assignee's copending U.S. application Ser. No. 07/920,834, incorporated herein by reference.

C. The Resulting Abrasive Grain

The presence of the zirconia in the alumina system, when the zirconia is provided as a particle sol in the alpha alumina monohydrate sol-gel, as well as the particle size of the zirconia and the volume present, enhances the properties of the resulting abrasive grains. It is presently believed that the zirconia particles (when added according to the sol process as described) may improve the microstructure of the abrasive grains by hindering grain growth in the alpha alumina and alumina reaction products. Thus, it is theorized that the addition of zirconia (as a sol) refines and homogenizes the alumina microstructure and aids in densification.

Figure 4:
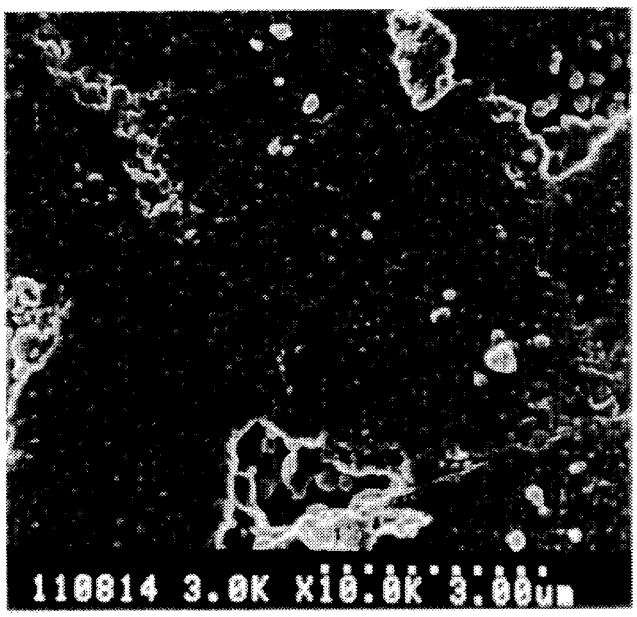
FIG. 4 is a field emission scanning electron photomicrograph of an abrasive grain according to Example 19 taken at 10,000X.
Figure 5:
FIG. 5 is a field emission scanning electron photomicrograph of an abrasive grain according to Comparative B taken at 10,000X.

FIGS. 4–9 and Experimental Example 19 (and Comparative B) exemplify the unique abrasive grain microstructure and possible advantages obtained with abrasive grains prepared according to the present invention. FIG. 4 is of an abrasive grain according to Example 19. FIG. 5 is of an abrasive grain according to Comparative Example B. Both of these (unseeded) abrasive grains contain 60% by weight alpha alumina and 40% by weight zirconia. Example 19 was made utilizing a zirconia sol (according to the invention). Comparative Example B was made utilizing a zirconia salt (i.e., no zirconia particles in the sol-gel). For both examples, the samples were polished to a one micrometer finish and were thermally etched for 15 minutes at 1250° C. The samples were examined utilizing a field emission scanning electron microscope at 10,000X (FIGS. 4 and 5). The very white material on both samples is debris. The darker area is the alpha alumina and the whiter area is the zirconia.

Referring to FIG. 4, an abrasive grain according to the invention, the size of the alpha alumina crystallites ranges from about 0.05 to about 0.3 micrometer, usually between 0.05 to about 0.2 micrometer. A collection of these alpha alumina crystallites is referred to as a domain. The alpha alumina crystallites within the domain have low angle grain boundaries. The domains range in size from about 3 to about 10 micrometers, usually from about 3 to about 5 micrometers. The zirconia particles are present within the domains, i.e., between alpha alumina crystallites and between adjacent domains. The zirconia particles (as a whole) range in size from about 0.05 to about 1 micrometer, usually between about 0.05 to about 0.5 micrometer. The zirconia particles present within the domains, however, are of much smaller particle size, usually between about 0.05 to about 0.2 micrometer, and are equiaxed. The term "equiaxed" as used in this context means that each zirconia particle is shaped with an extension of approximately an equal amount from a central point. Thus, each zirconia particle is roughly spherical. The zirconia particles present between the domains are more elongate (i.e., having an aspect ratio of greater than about 2:1) than the particles within the domains. The zirconia particles between the domains have a particle size between about 0.2 to about 0.8 micrometer, usually between 0.2 to about 0.5 micrometer. When the zirconia is present within alumina domains, the zirconia is present as individual particles dispersed throughout the domain. When the zirconia is present between the domains, there may be several zirconia particles clustered together. The majority of the zirconia particles are present between alpha alumina crystallites within the domains.

In FIG. 4, the zirconia is uniformly and randomly distributed throughout the alumina crystallites. The term "uniform" in this context is meant to refer to the characteristic that the zirconia particles are nearly evenly distributed between the alpha alumina crystallites. The term "random" in this context is meant to refer to the characteristic that the zirconia particles do not follow the crystallite boundaries of the alpha alumina (i.e., the zirconia particles do not, in general, have the same orientation as the alpha alumina crystallites). In FIG. 5, by contrast, the zirconia particles follow the growth direction of the alpha alumina crystallites. Thus, in FIG. 5, the zirconia particles are not randomly distributed relative to the alpha alumina crystallites, rather the zirconia particles are aligned in rows.

When the zirconia is randomly distributed (FIG. 4), inhibition of crack propagation by the zirconia particles is about equal for stress applied from any direction. Thus, random distribution is a characteristic of a relatively tough abrasive grain. Such toughness may be a contributing factor to improved abrading performance. Additionally, since the zirconia is uniformly distributed, a relatively uniform hardness (both within the abrasive grain and from abrasive grain to abrasive grain) is achieved. By comparison, when the zirconia is aligned in rows (FIG. 5) crack propagation between the rows (i.e., "with" the grain) is more likely.

Figure 6:
FIG. 6 is a scanning electron photomicrograph of an abrasive grain according to Example 19 taken at 2,000X.
Figure 7:
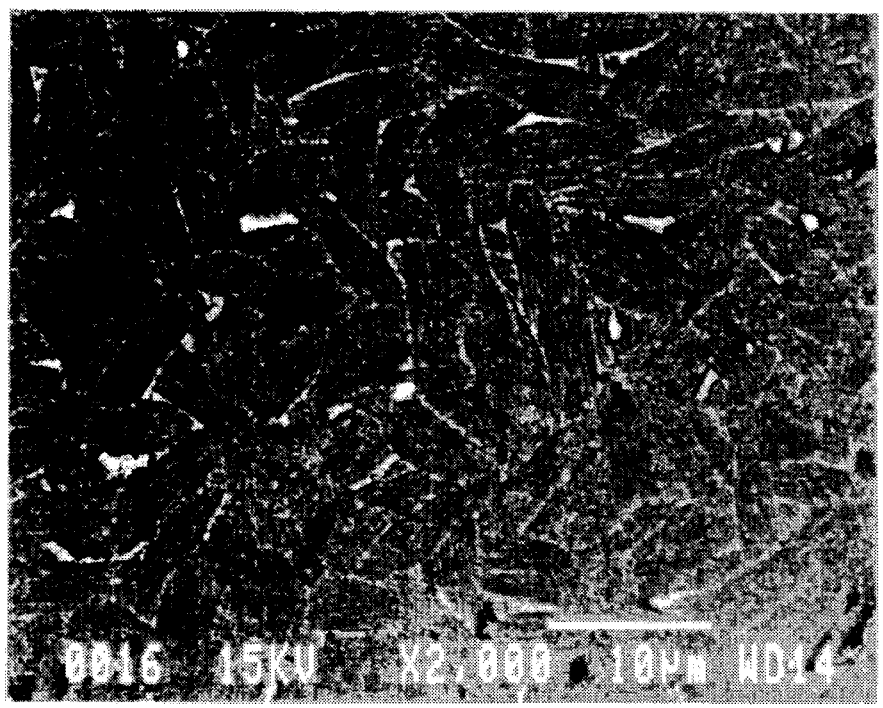
FIG. 7 is a scanning electron photomicrograph of an abrasive grain according to Comparative B taken at 2,000X.

FIG. 6 is a scanning electron photomicrograph of Example 19, which had been polished with a one micrometer abrasive, but had not been thermally etched. FIG. 7 is a scanning electron photomicrograph of Comparative Example B, which had been polished with one micrometer abrasive, but had not been thermally etched. In FIG. 7, the alpha alumina domains are seen to be more elongate for Comparative B than they are for a grain made according to the zirconia sol method, FIG. 6.

Figure 8:
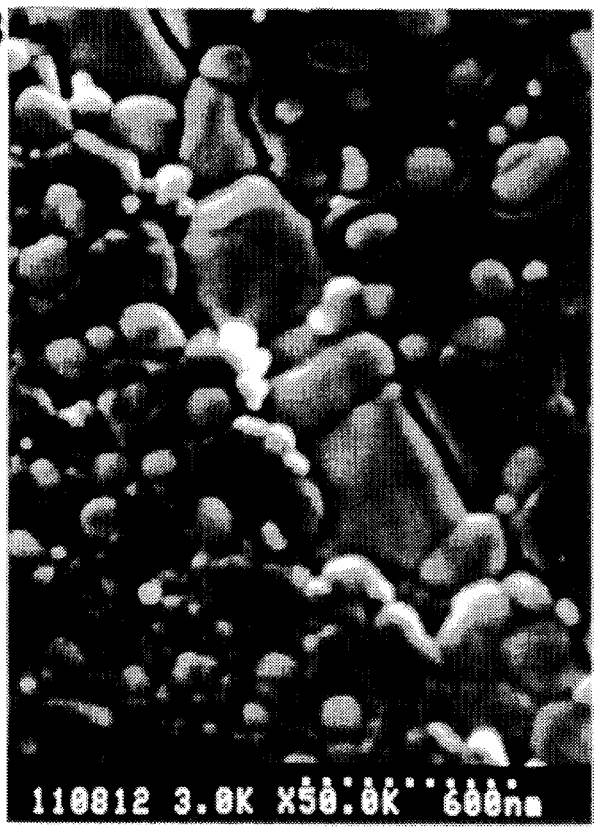
FIG. 8 is a field emission scanning electron photomicrograph of an abrasive grain according to Example 19 at 50,000X.
Figure 9:
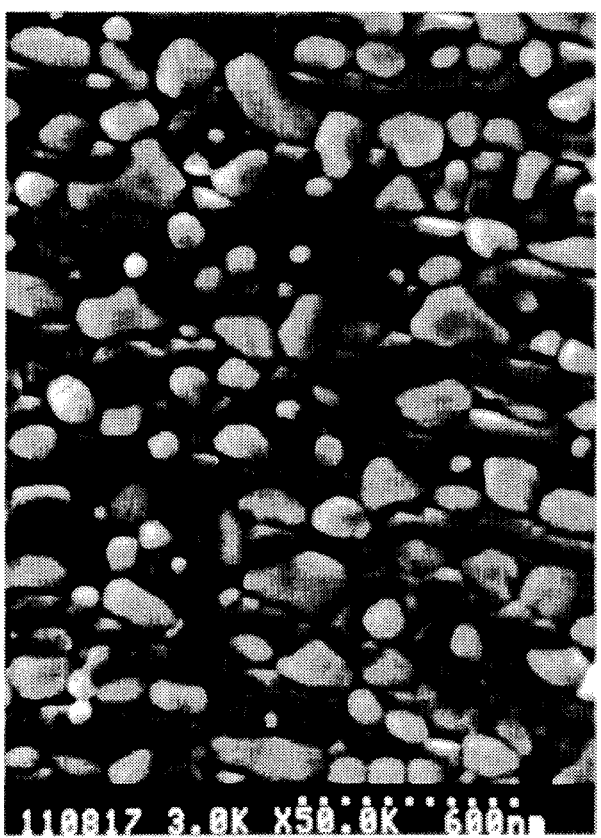
FIG. 9 is a field emission scanning electron photomicrograph of an abrasive grain according to Comparative B taken at 50,000X.

FIGS. 8 and 9 are similar to FIGS. 4 and 5, respectively, except that the photomicrographs were taken at 50,000X instead of 10,000X. The whitish particles are zirconia and the darker particles are alpha alumina crystallites. Relative to FIG. 8, the large particles are zirconia particles between the alpha alumina domains. The zirconia particles in the alpha alumina domains are relatively uniform and equiaxed. Referring to FIG. 9, the zirconia particles are irregular in shape, some are equiaxed, and some are elongate.

Zirconia in the tetragonal form is preferred for an abrasive grain since material containing the tetragonal form have been found to have increased toughness. The retention of the tetragonal form is dependent on the zirconia particle size. The smaller the zirconia particle size, the more it tends to remain in the tetragonal phase even at lower temperatures. The mechanism by which the zirconia acts to toughen the abrasive grain is variable, and may include transformation toughening and microcrack and crack deflection mechanisms. This is further described in the book "Transformation Toughening of Ceramics," by Green, Hannink, and Swain, 1989, published by the CRC Press, Boca Raton, Fla., incorporated herein by reference. It is presently believed that the small 0.05 to 1 micrometer, uniformly and randomly zirconia-distributed particles achievable with the present invention, facilitate toughness.

In general, ceramic abrasive grains according to the present invention comprise between about 40 to about 99.9%, preferably, about 80 to about 97%, alumina by weight, and about 0.1 to about 60%, preferably, about 3 to about 20% zirconia by weight, the weight percentages of the abrasive grain being calculated on a theoretical oxide basis assuming no modifier addition, disregarding the weight of any added coating, without regard to the actual phases present. If modifier and/or coating is used, the weight effect of this should be taken into consideration with respect to the ranges stated. The zirconia is preferably present within the ceramic abrasive grains as particles which have a size of about 0.05 to about 1, preferably, about 0.05 to about 0.5 micrometer. The zirconia particles are "equiaxed" and are substantially randomly and substantially uniformly distributed between alpha alumina crystallites. Such a size and distribution of zirconia particles within the ceramic abrasive grain is readily achievable by preparing the grains by sintering a grit material formed from a sol-gel process wherein the zirconia was provided as a sol of dispersed zirconia particles having the size range described above for preparation of the base grits.

A preferred abrasive grain containing rare earth oxide and a method of making the same is disclosed in Assignee's copending application entitled "Abrasive Grain Including Rare Earth Oxide Therein," U.S. Ser. No. 07/951,671 filed the same date as the instant application, the disclosure of which is incorporated herein by reference.

Preferred abrasive grains according to the present invention comprise, without considering the presence of any coating, a sintered product comprising by weight: about 70 to about 95%, preferably, about 85 to about 93%, alumina; about 0.1 to about 15%, preferably, about 0.5 to about 10%, zirconia, the zirconia being added as a sol during the base grit formation as described; an effective amount typically of at least about 0.5%, but no more than about 10%, and, preferably, about 0.5 to about 3%, yttria; about 0.1 to about 10%, preferably, about 0.5 to about 5%, rare earth oxide(s); and about 0.5 to about 10%, preferably, about 0.5 to about 1.5%, magnesium oxide. The rare earth oxides can be selected from the group consisting of oxides of: praseodymium, samarium, ytterbium, neodymium, lanthanum, gadolinium, cerium, dysprosium, erbium, and combinations thereof. Since coating is disregarded, the formula is for the "core" of the sintered particles. Depending on the composition of the sintered abrasive grain, a reaction product between alumina and one or more metal oxides (and/or a reaction product between one or more metal oxides) may be present i.e., alumina reaction product, zirconia reaction product, magnesium oxide reaction product, yttria reaction product, rare earth oxide reaction product, etc. may be present. Non-reacted alumina (i.e., alumina present as $Al_2O_3$) is present as alpha alumina.

Abrasive grains having the preferred composition stated in the previous paragraph are generally observed to have an average hardness of at least about 21 GPa (typically at least about 22 GPa) and an average toughness of at least about 4 MPa·m$^{1/2}$. The average hardness is measured according to American Standard Test Method (ASTM) standard E384 with a 500 gram load ("Standard Test Method for Microhardness of Materials," 1991 *Annual Books of ASTM Standards,* Sec. 3, Vol. 3.01, p 463), the test method being incorporated herein by reference. The average toughness is measured according to the microfracture indentation technique as illustrated in the article "Equilibrium Penny-Like Cracks in Indentation Fracture," by Lawn and Fuller, *J. Mat. Sci.,* Volume 10, 1974, pp. 2016–24, incorporated herein by reference. Herein when it is said that the abrasive grain possesses the minimum average hardness and minimum average toughness as stated, reference is meant to the abrasive grain if formulated with the components indicated and sintered, without regard to the presence of a coating. That is, hardness and toughness measurements are taken of the core, not the coating.

A preferred abrasive grain containing rare earth oxide and a method of making the same is disclosed in Assignee's copending application entitled "Abrasive Grain Including Rare Earth Oxide Therein," U.S. Ser. No. 07/951,671 filed the same date as the instant application, the disclosure of which is incorporated herein by reference.

D. Abrasive Products

The present invention includes within its scope the provision of abrasive products including abrasive grains as described herein. Preferably, the abrasive grains will have been prepared according to the processes described herein and comprise the sintered product of a base grit material resulting from a sol-gel process wherein alpha alumina precursor is mixed with zirconia sol. Again, the abrasive grains may have been formed with, or later modified with, an impregnation process, nucleating agent processes and/or coating process, as generally indicated.

One type of abrasive product according to the present invention is a coated abrasive which comprises a backing (substrate) with abrasive grains, as described herein, adhered thereto by binder. The backing may be cloth, polymeric film, fiber, nonwoven web, paper, combinations thereof, or treated versions thereof. A variety of inorganic or organic binders could be utilized. The abrasive grains may be applied in one layer or a plurality of layers. Preferred methods of making coated abrasives are described in U.S. Pat. Nos. 4,734,104 (Broberg) and 4,737,163 (Larkey), the disclosures of which are incorporated herein by reference.

An example of a coated abrasive product is provided in FIG. 1 at reference numeral 1. Referring thereto, backing (substrate) 2 has abrasive layer 3 comprising abrasive grain 4 secured to a major surface of backing 2 by make coat 5 and size coat 6. In some instances a supersize coat, not shown, may be used.

Figure 2:
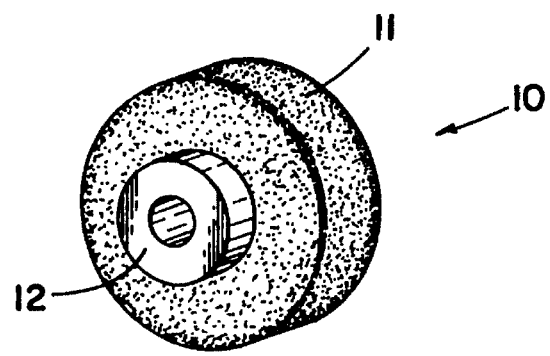
FIG. 2 is a perspective view of a bonded abrasive product incorporating therein abrasive grains according to the present invention.

Bonded abrasive products (e.g., grinding wheels and cutoff wheels) according to the present invention generally comprise shaped masses of abrasive grain, described herein, held together by a binder. Conventional binders for grinding wheels include organic, metallic, or vitrified binder. In FIG. 2, grinding wheel 10 is depicted comprising abrasive grain 11 molded in a wheel and mounted on hub 12. For additional details in the preparation of grinding wheels see, for example, U.S. Pat. No. 4,997,461 (Markhoff-Matheny), the disclosure of which is incorporated herein by reference. Cutoff wheels can be made using conventional techniques known in the art. Binders for cutoff wheels include organic binder.

Figure 3:
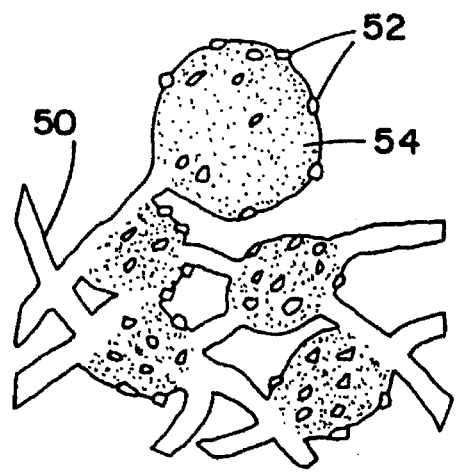
FIG. 3 is an enlarged schematic view of a nonwoven abrasive product incorporating therein abrasive grains according to the present invention.

Nonwoven abrasive products incorporating abrasive grains according to the present invention typically comprise an open porous lofty polymer filament structure having the abrasive grains of the invention distributed throughout the fiber structure and bonded therein by an organic binder. Typical fibrous filament structures usable with such constructions comprise polyamides, polyesters and polypropylenes. In FIG. 3, a schematic depiction, enlarged about 100X, of a typical nonwoven abrasive article is provided. The article comprises fibrous mat 50 as a substrate onto which abrasive grain 52 are adhered by binder 54. For additional details in the preparation of nonwoven abrasive products see, for example, U.S. Pat. No. 2,958,593 (Hoover et al.), the disclosure of which is incorporated herein by reference.

As indicated generally above, abrasive products according to the present invention generally comprise binder and abrasive grains or particles therein. A wide variety of binders may be utilized in abrasive products according to the present invention, including conventional ones. Useful organic binders include phenolic, urea-formaldehyde, melamine-formaldehyde, polyester resins, glue, aminoplast resins, epoxy resins, acrylate resins, urethane resins and combinations thereof. The binder may include inorganic particulates such as grinding aids or fillers. Examples of such grinding aids include cryolite, ammonium cryolite, potassium tetrafluoroborate, polyvinyl chloride, sulfur and sodium chloride. Examples of fillers include calcium carbonate, silica and calcium metasilicate.

Abrasive products or articles according to the present invention may contain, as particulate material therein, 100% abrasive grains which have been prepared or improved according to the descriptions herein. In addition, or alternatively, abrasive articles may contain a blend of abrasive grains according to the present invention with conventional abrasive grains or diluent grains. Conventional abrasive grains usable in this fashion include fused aluminum oxide, silicon carbide, garnet, fused alumina, diamond, cubic boron nitride, fused alumina-zirconia, and other sol-gel abrasive grains. Diluent grains include marble, gypsum, and glass. Abrasive grains according to the present invention may be combined with abrasive agglomerates (see, e.g., U.S. Pat. No. 4,799,939 (Bloecher et al.)).

Objects and advantages of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Abrasive grains were made according to the Procedure outlined below. All abrasive grain formulations are based upon weight. After the abrasive grains were made, they were employed in a coated abrasive fibre disc which was made according to one of the following procedures. The resulting coated abrasive discs were tested according to a Test Procedures described below. For Examples 1 to 12, preparation of the abrasive grains did not include use of a nucleating material (i.e., the abrasive grains were unseeded). The weight percents given herein are calculated on an elemental oxide basis and may not reflect the phases (e.g., reaction product(s)) present.

General Procedure I For Making The Abrasive Grains

The following were charged into a 18.9 liter polyethylene lined steel vessel to form a dispersion, 2269 parts of room temperature deionized water, 45 parts of 16N analytical reagent grade nitric acid, a zirconia sol, and 643 parts of alpha aluminum oxide monohydrate powder sold under the trade designation Disperal®, commercially available from Condea, Hamburg, Germany. The average particle size of the zirconia sol was between about 5 to about 10 nanometers. The zirconia sol was about 20% solids and purchased from Nyacol Products Inc. of Ashland, Mass. The resulting mixture was dispersed at high speed for 3 to 4 minutes using a Giford-Wood Homogenizer Mixer (Greeco Corp., Hudson, N.H.). The resulting sol was poured into a 46 cm by 66 cm by 5 cm polyester-lined aluminum tray where it was dried in a forced air oven at 100° C. for about 24 hours to a friable solid. The resulting dried material was crushed using a "Braun" type UD pulverizer having a 1.1 mm gap between the steel plates to form particles. The particles were screened between 0.125 to 1 mm screen size. The retained particles were fed into a rotary calciner to form calcined particles. The calciner was a 16 cm diameter 140 centimeter long stainless steel tube having a 40 cm 600° C. hot zone. The tube was inclined at a 2.4 degree angle with respect to the horizontal. The tube rotated at about 6 rpm to provide a residence time of about 5 minutes within the calciner.

The impregnating solutions were prepared with deionized water. The magnesium nitrate solution was about 11% solids on an oxide basis. The yttrium nitrate solution was about 23% solids on an oxide basis. The lanthanum nitrate solution was about 28% solids, and the cerium nitrate solution was about 39% solids, on an oxide basis. For every impregnation step there was about 50 ml of impregnation solution per 100 grams of particles. The impregnation solution and the calcined particles were thoroughly mixed together to cause the solution to be impregnated into the calcined particles by capillary action. The resulting impregnated particles were dried in a forced air oven at 100° C. for about 10 hours. The dried particles were then fed into a rotary calciner as described above. If multiple impregnations were done, the calcined (non-sintered) particles would be allowed to cool, and then they would be impregnated again with the desired impregnation solutions. Next, the calcined, impregnated particles were fed into a 1400° C. kiln. The kiln was a 8.9 cm diameter, 1.3 meter long silicon carbide tube inclined at 4.4 degrees with respect to the horizontal and had a 76 cm hot zone. The kiln rotated at 6 rpm to provide a residence time in the kiln of about 5 minutes. The product exited the kiln into room temperature air where it was collected in a metal container and allowed to cool to room temperature.

General Procedure II for Making the Abrasive Grains

The following were charged into a 18.9 liter polyethylene lined steel vessel to form a dispersion, 6036 parts of room temperature deionized water, 72 parts of 16N analytical reagent grade nitric acid, 5100 parts of a zirconia source, and 1543 parts of alpha aluminum oxide monohydrate powder sold under the trade designation Disperal®. The resulting mixture was dispersed at high speed for 3 to 4 minutes using a Giford-Wood Homogenizer Mixer (Greeco Corp., Hudson, N.H.). The resulting sol was poured into a 46 cm by 66 cm by 5 cm polyester-lined aluminum tray where it was dried in a forced air oven at 100° C. for about 24 hours to a friable solid. The resulting dried material was crushed using a "Braun" type UD pulverizer having a 1.1 mm gap between the steel plates to form particles. The particles were screened between 0.125 to 1 mm screen size. The retained particles were fed into a kiln to form calcined particles. The calciner was a 16 cm diameter, 140 cm long, stainless steel tube having a 40 cm 600° C. hot zone. The tube was inclined at a 2.4 degree angle with respect to the horizontal. The tube rotated at about 6 rpm to provide a residence time within the calciner of about 4 to 5 minutes. Next, the calcined particles were fed into a 1400° C. kiln. The kiln was an 8 cm diameter, 1.3 meter long silicon carbide tube inclined at 4.4 degrees with respect to the horizontal, and had a 76 cm hot zone. The kiln rotated at 6 rpm to provide a residence time in the kiln of about 5 minutes. The product exited the kiln into room temperature air where it was collected in a metal container and allowed to cool to room temperature.

General Procedure for Making the Coated Abrasive Disc

The abrasive grains were utilized in coated abrasive products which were then tested. The coated abrasive products were made according to conventional coated abrasive-making procedures. A grade 50 abrasive grain was prepared by taking 50% by weight from abrasive grains that passed through a 40 mesh U.S. standard screen, but remained on a 45 mesh U.S. standard screen and 50% by weight of abrasive grains that passed through a 40 mesh U.S. standard screen, but were retained on a 50 mesh U.S. standard screen. A grade 40 abrasive grain was prepared by taking 100% by weight of abrasive grains that passed through a 35 mesh U.S. standard screen, but were retained on a 40 mesh U.S. standard screen. Likewise, a grade 36 abrasive grain was prepared by taking 50% by weight from abrasive grains that passed through a 25 mesh U.S. standard screen, but remained on a 30 mesh U.S. standard screen. The remaining 50% were abrasive grains that passed through a 30 mesh U.S. standard screen, but were retained on a 35 mesh U.S. standard screen. The abrasive grains were bonded to vulcanized fibre backings using conventional calcium carbonate filled phenolic make resin and conventional calcium carbonate filled phenolic size resins. The make resin was pre-cured by heating to about 88° C. at a rate of about 1.1° C./minute, and then holding at about 88° C. for about 2 hours. The size resin was cured by heating to about 65° C. at a rate of about 1.1° C./minute, and then holding at about 65° C. for about 30 minutes, followed by a heating to about 99° C. at a rate of about 0.6° C./minute, and then holding at about 99° C. for about 12 hours. The abrasive grains were electrostatically coated.

If the coated abrasive fiber disc was to be utilized to grind stainless steel, supersize coating was applied over the size coat. The supersize comprised (by weight) 14.3 parts bisphenol A epoxy resin (available under the trade designation EPON 828 from Shell Chemical Co., Houston, Tex.), 9.4 parts polyamide curing agent (obtained from Henkel Corp., Gulph Mills, Pa., under the trade designation Versamid 125), 71.25 parts $KBF_4$, 1.9 parts thickening agent (obtained from Cabot Corp., Kokomo, Ind., under the trade designation Cab-O-Sil), and 3.1 parts iron oxide filler. The supersize coating was deposited from an organic solvent and then heated to cure.

Test Procedure I

The coated abrasive disc was mounted on a beveled aluminum back-up pad and used to grind the face of a 1.25 cm by 18 cm 1018 mild steel workpiece. The disc was driven at 5,500 rpm while the portion of the disc overlaying the beveled edge of the back-up pad contacted the workpiece at about a 6 kg load. Each disc was used to grind a separate workpiece for a one minute interval for a total time of 12 minutes. The initial cut was the amount to metal removed in the first minute of grinding. Likewise, the final cut was the amount of metal removed in the last minute of grinding and the total cut was the summation of the amount removed throughout the test. In most of the examples, the performance of the abrasive grain is stated as a percent of comparative, that is the total amount of metal removed for the comparative example was equated to 100% and the abrasive grain of the examples was measured relative to the 100%. There were approximately four discs per example tested. The error associated with each Test Procedure described herein was about ±5%.

Test Procedure II

The Test Procedure II was essentially the same as Test Procedure I, except that the workpiece was 304 stainless steel, and the test endpoint was 10 minutes.

Test Procedure III

The Test Procedure III was essentially the same as Test Procedure I, except that the test endpoint was 20 minutes.

Comparative Example A

The abrasive grains were made according to the teachings of U.S. Pat. No. 4,881,951 (Wood). The alpha alumina based abrasive grains were made according to the sol-gel method and had a composition of 94.7% alumina, 2.7% lanthanum oxide, 1.3% magnesia, and 1.3% yttria.

Examples 1 through 12

This set of examples compared various abrasive grain compositions. The abrasive grains were screened to a grade 50. The test results can be found in Tables 1 through 4, below. For Examples 1 through 12, the abrasive grains were made according to General Procedure I, and there was a single impregnation step for this example. The impregnation solution contained lanthanum nitrate, magnesium nitrate, and yttrium nitrate. The amounts of these materials were selected to give the sintered abrasive grain composition described below in Table 1. For these Examples the zirconia sol had an average particle size of five nanometers. For Examples 1, 3, 5, 7, 9, and 11, the zirconia sol was stabilized with acetic acid and had a pH of 3.5. For Examples 2, 4, 6, 8, 10, and 12, the zirconia sol was stabilized with nitric acid and had a pH of 0.5. The test results are shown in Tables 2, 3, 4, and 5, below.

TABLE 1

Compositions for Examples 1 through 12

| Ex | % $Al_2O_3$ | % $La_2O_3$ | % $Y_2O_3$ | % MgO | % $ZrO_2$ |
|---|---|---|---|---|---|
| 1 | 82.9 | 2.7 | 1.3 | 1.3 | 11.8 |
| 2 | 82.9 | 2.7 | 1.3 | 1.3 | 11.8 |
| 3 | 93.9 | 2.7 | 1.3 | 1.3 | 0.8 |
| 4 | 93.9 | 2.7 | 1.3 | 1.3 | 0.8 |
| 5 | 93.1 | 2.7 | 1.3 | 1.3 | 1.6 |
| 6 | 93.1 | 2.7 | 1.3 | 1.3 | 1.6 |
| 7 | 91.5 | 2.7 | 1.3 | 1.3 | 3.2 |
| 8 | 91.5 | 2.7 | 1.3 | 1.3 | 3.2 |
| 9 | 88.5 | 2.7 | 1.3 | 1.3 | 6.2 |
| 10 | 88.5 | 2.7 | 1.3 | 1.3 | 6.2 |
| 11 | 78.0 | 2.7 | 1.3 | 1.3 | 16.7 |
| 12 | 78.0 | 2.7 | 1.3 | 1.3 | 16.7 |

TABLE 2

Test Procedure I

| Example | Initial cut, grams | Final cut, grams | Total cut, % of Comparative A |
|---|---|---|---|
| Comparative A | 81.3 | 68.6 | 100 |
| 1 | 93.8 | 61.6 | 106 |
| 2 | 93.1 | 83.0 | 116 |

TABLE 3

Test Procedure III

| Example | Initial cut, grams | Final cut, grams | Total cut, % of Comparative A |
|---|---|---|---|
| Comparative A | 59.1 | 32.1 | 100 |
| 3 | 63.0 | 39.1 | 109 |
| 4 | 58.5 | 43.3 | 105 |
| 5 | 61.4 | 35.2 | 111 |
| 6 | 59.6 | 31.4 | 96 |

TABLE 4

Test Procedure III

| Example | Initial cut, grams | Final cut, grams | Total cut, % of Comparative A |
|---|---|---|---|
| Comparative A | 62.5 | 30.6 | 100 |
| 7 | 66.7 | 62.1 | 129 |
| 8 | 65.1 | 62.7 | 127 |
| 9 | 64.9 | 56.9 | 129 |
| 10 | 66.7 | 58.3 | 126 |

TABLE 5

Test Procedure III

| Example | Initial cut, grams | Final cut, grams | Total cut, grams |
|---|---|---|---|
| 1 | 66.6 | 50.8 | 1390 |
| 2 | 66.8 | 47.4 | 1423 |
| 3 | 68.1 | 36.5 | 1367 |
| 4 | 65.3 | 37.2 | 1311 |

Hardness, density, and toughness studies are reported in Table 6, below. Specifically, for both the microhardness and the toughness measurements, abrasive grains were mounted in a conventional molding compound (commercially available under the trade designation "EPOMET" from Buehler, Ltd. of Evanston, Ill.) in 2.5 cm (1 inch) diameter stainless steel mold rams. The grains and the molding compound were then pressed at 27.6 MPa (4000 psi) and simultaneously heated to about 150° C. in a conventional mounting press (commercially available under the trade designation "BUEHLER PNEUMET I MOUNTING PRESS" from Buehler, Ltd.). The molding compound was then cured by holding it at about 150° C. for about 5 minutes. The cured molding compound was then cooled to room temperature.

The mounted abrasive grains were then polished using a polishing unit (commercially available under the trade designation "DIALOG" from Buehler, Ltd.) having a microprocessor control that dispenses abrasive slurries to the polishing area (commercially available under the trade designation "METLAP I" from Buehler, Ltd.). The polishing was done in the following successive stages:

Stage 1

Polishing surface: alumina platen, 20.3 cm diameter (commercially available under the trade designation "METLAP 10" from Buehler, Ltd.)
Abrasive Type & Size: 30 micrometer diamond slurry (commercially available under the trade designation "METADI DIAMOND SLURRY" from Buehler, Ltd.)
Polishing Time: 3 minutes, or until the surface is flat
Force: 22.2N/sample (5 pounds/sample)
Speed setting: 240 rpm
Dispensing sequence: 1 second spray on; 10 spray off
Relative rotation: clockwise Stage 2

Polishing surface: polishing cloth (commercially available under the trade designation "TEXMET POLISHING CLOTH" from Buehler, Ltd.) clamped on a 20.3 diameter aluminum platen (commercially available under the trade designation "METLAP" from Buehler, Ltd.).
Abrasive Type & Size: 6 micrometer diamond slurry (commercially available under the trade designation "METADI DIAMOND SLURRY" from Buehler, Ltd.)
Polishing Time: 10 minutes
Force: 22.2N/sample (5 pounds/sample)
Speed setting: 120 rpm
Dispensing sequence: 1 second spray on; 10 spray off
Relative rotation: counterclockwise Stage 3

Polishing surface: polishing cloth ("TEXMET POLISHING CLOTH") clamped on a 20.3 diameter aluminum platen ("METLAP")
Abrasive Type & Size: 1 micrometer diamond slurry (commercially available under the trade designation "METADI DIAMOND SLURRY" from Buehler, Ltd.)
Polishing Time: 30 minutes
Force: 22.2N/sample (5 pounds/sample)
Speed setting: 120 rpm
Dispensing sequence: 1 second spray on; 10 seconds spray off
Relative rotation: clockwise The Vickers microhardness of the abrasive grains was measured using a conventional microhardness tester with a diamond indenter (commercially available under the trade designation "MINILOAD 2 MICROHARDNESS TESTER" from Leitz of Germany). The indenter (a highly polished pointed square pyramidal diamond with a face angle of 136 degrees) was brought into contact gradually and smoothly with the sample to be measured. The predetermined load was 500 grams. The average of 20 measurements for each example are provide in Table 6, below.

The toughness measurement was made using the same instrument as described above for the Vickers microhardness measurement, wherein a predetermined load was applied to the sample to be tested causing cracks to generate at the apex of the diamond shape impression of the indenter. The toughness would be determined using the following equation:

$$\text{Toughness, } K_I = \frac{F_N}{((pi)c)^{3/2} (\tan \beta)},$$

wherein c is the crack radius, $F_N$ is the indentor load, and $\beta$ is the semi-apical angle of the indenter (68 degrees for a Vickers diamond). The average of 20 measurements for each example are provide in Table 6, below.

The densities were determined using a Micromeritics (Norcross, Ga.) AccuPyc 1330 pycnometer.

TABLE 6

| Example | Density g/cm³ | Hardness, GPa | Toughness, MPa · m^{1/2} |
|---|---|---|---|
| Comparative A | 3.85 | 19 | 3.6 |
| 1 | 4.09 | 22.6 | 4.1 |
| 2 | 4.08 | 22.6 | 4.0 |
| 3 | 3.98 | 22.2 | 4.1 |
| 4 | 3.98 | 22.2 | 4.0 |
| 5 | 3.98 | 22.3 | 4.1 |
| 6 | 3.99 | 22.2 | 4.1 |
| 7 | 4.01 | 22.7 | 4.1 |
| 8 | 3.98 | 22.6 | 4.1 |
| 9 | 4.03 | 22.8 | 4.1 |
| 10 | 4.04 | 22.4 | 4.0 |
| 11 | 4.11 | 22.5 | 4.2 |
| 12 | 4.1 | 22.3 | 4.1 |

Examples 13 through 18

This set of examples compared various abrasive grains compositions. The abrasive grains were screened to a grade 40. The test results can be found in Table 7, below. For these examples, the abrasive grains were made according to General Procedure I, and the impregnation solution contained the nitrate salt of a rare earth and magnesium nitrate. For Example 13, the rare earth was dysprosium, likewise Example 14 was gadolinium, Example 15 was lanthanum, Example 16 was neodymium, Example 17 was praseodymium, and Example 18 was samarium. The sintered abrasive grain for this set of examples contained about 92.7% alumina, 2% zirconia, 2.7% rare earth oxide, 1.3% yttria, and 1.3% magnesium oxide.

TABLE 7

| | Test Procedures I and II | |
|---|---|---|
| Example | Final cut, grams (1018 Steel) | Final cut, grams (304 Stainless Steel) |
| 13 | 967 | 152 |
| 14 | 935 | 160 |
| 15 | 948 | 177 |
| 16 | 1130 | 190 |
| 17 | 1097 | 101 |
| 18 | 972 | 171 |

Example 19 and Comparative B

The abrasive grain for these examples were made according to General Procedure II for Making the Sol-Gel Abrasive Grain. For Example 19, the zirconia source was a zirconia sol that had an average particle size between about 5 and about 10 nanometers. The zirconia sol was about 20% solids and was purchased from Nyacol Products Inc. of Ashland, Mass. For Comparative Example B, the zirconia source was zirconyl acetate that was 20% solids in water. For both examples, the abrasive grains were incorporated into a coated abrasive article according to the "General Procedure for Making the Coated Abrasive Disc" given above. The resulting coated abrasive fibre discs were tested according to Test Procedure I. The test results can be found in Table 8, below. The resulting grains were examined by electron microscope, as indicated above with the descriptions of FIGS. 4–9.

TABLE 8

| | Test Procedure I | | |
|---|---|---|---|
| Example | Initial cut, grams | Final cut, grams | Total cut, grams |
| Comparative B | 52.1 | 27.4 | 586 |
| 19 | 58.7 | 60.9 | 794 |

It can be seen from the above grinding results that the abrasive grain made with the zirconia sol (Example 19) had a higher initial cut, final cut, and total cut than the abrasive grain made with the zirconia salt (Comparative Example B). That is, Example 19 gave a 36% higher total cut than Comparative Example B. The chemical make up of both abrasive grains, however, was essentially the same.

An X-ray diffraction trace of these examples was completed utilizing Philips X-Ray Diffractometer Model #3100. From the X-ray diffraction trace, the amount of zirconia in the tetragonal and in the monoclinic form was determined. For Example 19, there was approximately 81% in the tetragonal form, while the remainder was monoclinic. For Comparative Example B, there was approximately 43% in the tetragonal form, while the remainder was monoclinic. Thus, the example (Example 19) made from the zirconia sol contained a considerably higher level of zirconia in the tetragonal form.

Next, 10 grams of each sample was crushed for 6 minutes with a Retsch pulverizer using tungsten carbide abrasive media. Then each sample was submitted for an X-ray Diffraction scan. For Example 19, there was approximately 58% in the tetragonal form, while the remainder was monoclinic. For Comparative Example B, there was approximately 37% in the tetragonal form, while the remainder was monoclinic. Thus, the example (Example 19) made from the zirconia sol retained more of the tetragonal form after forces of stress were applied. It may be theorized that this retention of the tetragonal form contributes to the increase in abrading performance.

Various modifications and alterations of this invention will become apparent to those skilled in the art without departing from the scope and spirit of this invention, and it should be understood that this invention is not to be unduly limited to the illustrative embodiments set forth herein.

What is claimed is:

1. A method of preparing abrasive grain material; said method comprising the steps of:
   (a) preparing a dispersion of alumina hydrate and zirconia particles, wherein at least about 97% by weight of said zirconia particles are less than about 0.2 micrometer in size;
   (b) forming alumina base grits from said dispersion; and
   (c) sintering said alumina base grits to provide abrasive grain comprising about 70 to about 99.9 percent by weight alumina and at least about 0.1 percent by weight zirconia, based on the total weight of said abrasive grain, said alumina being present as one of alpha alumina, alumina reaction product, or a combination thereof, said zirconia being present as one of zirconia or zirconia and zirconia reaction product, with the proviso that said zirconia particles are present in said dispersion in an amount sufficient to increase densification of said abrasive grain of step (c) as compared to an abrasive grain made according to steps (a), (b), and (c) without the presence of zirconia in said abrasive grain.

2. A method according to claim 1 wherein said dispersion is aqueous dispersion, and further comprises the step of calcining said alumina base grits of step (b) before said sintering of step (c).

3. A method according to claim 2 wherein said dispersion contains a sufficient amount of said zirconia particles therein such that said abrasive grain of step (c) comprises between about 0.1% and about 30% by weight zirconia.

4. A method according to claim 2 wherein said dispersion comprises about 15 to about 40% by weight colloidal zirconia particles of which about 50% by weight are less than about 0.05 micrometer in size.

5. A method according to claim 2 wherein said aqueous dispersion comprises about 30 to about 80% by weight water.

6. A method according to claim 2 wherein said aqueous dispersion further comprises a nucleating material.

7. A method according to claim 2 wherein said aqueous dispersion further comprises a metal oxide precursor.

8. A method according to claim 2 including a step of impregnating said calcined alumina base grits with metal oxide precursor prior to said step of sintering.

9. A method according to claim 8 wherein said metal oxide precursor is a precursor of an oxide selected from the group consisting of yttria, magnesium oxide, and a rare earth oxide; wherein said metal oxide precursor is present in an amount sufficient to provide abrasive grain of step (c) with at least about 0.5% by weight of at least one metal oxide, said metal oxide being present as one of a metal oxide, metal oxide reaction product, or a combination thereof,
   (i) said rare earth oxide being selected from the group consisting of oxides of: praseodymium, samarium, ytterbium, neodymium, lanthanum, gadolinium, cerium, dysprosium, erbium, and mixtures thereof; and
   (ii) each of said yttria, magnesium oxide, and rare earth oxide, if present in said abrasive grain of step (c), being present up to about 10% by weight;

and wherein said abrasive grain of step (c) comprises about 70 to about 95 percent by weight alumina and about 0.1 to about 15 percent by weight zirconia.

10. A method according to claim 9 wherein said yttria precursor is present in an amount sufficient to provide abrasive grain with about 0.5 to about 10% yttria.

11. A method according to claim 10 wherein said magnesium oxide precursor is present in an amount sufficient to provide said abrasive grain with about 0.5 to about 1.5% by weight magnesium oxide; and said rare earth oxide precursor is present in an amount sufficient to provide said abrasive grain with about 0.5 to about 5% by weight rare earth oxide.

12. A method according to claim 2 including a step of coating at least one of said alumina base grits and said calcined alumina base grits with a material selected from the group consisting of metal oxides, precursors thereof, and combinations thereof, prior to said step of sintering, said sintered abrasive grain comprising a sintered core and a metal oxide coating.

13. A method according to claim 2 wherein said dispersion further comprises a metal oxide precursor of an oxide selected from the group consisting of yttria, magnesium oxide, and a rare earth oxide; wherein said metal oxide precursor is present in an amount sufficient to provide abrasive grain of step (c) with at least about 0.5% by weight of at least one metal oxide, said metal oxide being present as one of a metal oxide, a metal oxide reaction product, or a combination thereof,
  (i) said rare earth oxide being selected from the group consisting of oxides of: praseodymium, samarium, ytterbium, neodymium, lanthanum, gadolinium, cerium, dysprosium, erbium, and mixtures thereof, and
  (ii) each of said yttria, magnesium oxide, and rare earth oxide, if present in said abrasive grain of step (c), being present up to about 10% by weight;
and wherein said abrasive grain of step (c) comprises about 70 to about 95 percent by weight alumina and about 0.1 to about 15 percent by weight zirconia.

14. The method according to claim 1 wherein said abrasive grain of step (c) comprises about 70 to about 97 percent by weight alumina.

15. The method according to claim 1 wherein said abrasive grain of step (c) comprises about 70 to about 95 percent by weight alumina.

16. A sintered abrasive grain comprising alpha alumina, including alpha alumina domains comprised of alpha alumina crystallites, and about 0.05 to about 1 micrometer particles of zirconia, said particles of zirconia being substantially uniformly distributed throughout said abrasive grain, and a majority of said zirconia particles in said alpha alumina domains being randomly and uniformly distributed between said alpha alumina crystallites.

17. An abrasive grain according to claim 16 further comprising about 0.5 to about percent by weight yttria and about 0.3 to about 1.5 percent by weight magnesium oxide therein, said yttria being present as yttria reaction product, and said magnesium oxide being present as magnesium oxide reaction product.

18. An abrasive grain according to claim 16 comprising:
  (a) about 70 to about 95% by weight alumina; said alumina being present as one of said alpha alumina or said alpha alumina and an alumina reaction product;
  (b) about 0.1 to about 15% by weight zirconia, said zirconia present being as one of said zirconia particles or zirconia particles and a zirconia reaction product;
  (c) about 0.5 to about 1.5% by weight magnesium oxide, said magnesium oxide being present as a magnesium oxide reaction product; and
  (d) about 0.1 to about 5% by weight of rare earth oxide selected from the group consisting of oxides of: praseodymium, samarium, ytterbium, neodymium, lanthanum, gadolinium, cerium, dysprosium, erbium and mixtures thereof, said rare earth oxide being present as one of a rare earth oxide, a rare earth oxide reaction product, or a combination thereof.

19. An abrasive grain according to claim 18 including about 0.5 to about 10% by weight yttria, said yttria being present as a yttria reaction product.

20. An abrasive grain comprising a core and a surface coating of metal oxide thereon, said core being said abrasive grain according to claim 19.

21. An abrasive article including:
  (a) a binder; and
  (b) a plurality of abrasive grain according to claim 16 secured within said article by said binder.

22. An abrasive article according to claim 21 wherein said abrasive article is a grinding wheel.

23. An abrasive article according to claim 21 wherein said abrasive article is a cutoff wheel.

24. An abrasive article according to claim 21 wherein said abrasive article is a nonwoven abrasive product.

25. A coated abrasive article comprising:
  (a) a backing having a major surface; and
  (b) an abrasive layer comprising abrasive grain according to claim 21 secured to said major surface of said backing by a binder.

* * * * *

UNITED STATES PATENT AND TRADEMARK OFFICE
CERTIFICATE OF CORRECTION

PATENT NO.: 5,551,963

DATED: September 3, 1996

INVENTOR(S): Henry A. Larmie

It is certified that error appears in the above-identified patent and that said Letters Patent is hereby corrected as shown below:

Title page,
Item [56] in the References Cited, Patent No. "4,881,851  11/1989  Wood et al. .........51/309" should read --4,881,951  11/1989  Wood et al. ............51/309--

In Column 2, line 14, "in situ" should read --in situ--

In Column 7, line 49, please delete the comma after "U.S. Pat. No. 5164,348"

In Column 7, line 49-50, delete "filed November 27, 1991".

Signed and Sealed this

Third Day of June, 1997

Attest:

BRUCE LEHMAN

Attesting Officer

Commissioner of Patents and Trademarks